United States Patent
Swope

(10) Patent No.: US 11,191,055 B1
(45) Date of Patent: Nov. 30, 2021

(54) RADIO-FREQUENCY IDENTIFICATION (RFID) LOCATIONING SYSTEMS AND METHODS FOR LOCATING ONE OR MORE ITEMS POSITIONED WITHIN A DEFINED SPACE

(71) Applicant: ZEBRA TECHNOLOGIES CORPORATION, Lincolnshire, IL (US)

(72) Inventor: Charles Burton Swope, Coral Springs, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/897,631

(22) Filed: Jun. 10, 2020

(51) Int. Cl.
  *H04W 64/00* (2009.01)
  *H04B 17/318* (2015.01)

(52) U.S. Cl.
  CPC .......... *H04W 64/00* (2013.01); *H04B 17/318* (2015.01)

(58) Field of Classification Search
  CPC .... H04W 64/00; G06K 7/0008; H04B 17/318
  USPC ........................................................ 455/456
  See application file for complete search history.

(56) References Cited

U.S. PATENT DOCUMENTS

| 2006/0076401 A1* | 4/2006 | Frerking | G06K 7/0008 235/380 |
| 2008/0150699 A1* | 6/2008 | Ohara | H04B 17/27 340/10.4 |
| 2020/0018810 A1* | 1/2020 | Seitz | G07F 17/322 |

* cited by examiner

*Primary Examiner* — Ted M Wang
(74) *Attorney, Agent, or Firm* — Yuri Astvatsaturov

(57) ABSTRACT

Radio-Frequency identification (RFID) locationing systems and methods for locating one or more items positioned within a defined space are disclosed herein. An example embodiment includes energizing, by an RFID reader having an RFID antenna, an RFID tag corresponding to an item positioned within a defined space. Each of a first signal strength and a second signal strength of the RFID tag is detected, respectively, by a first RFID receiver node of a first node channel and a second RFID receiver node of a second node channel. A controller alternates a multiplexor to receive at the multiplexor each of first signal strength data from the first RFID receiver node and second signal strength data from the second RFID receiver node. The first signal strength data and the second signal strength data is provided to the RFID reader and combined to determine a location of the item positioned within the defined space.

17 Claims, 8 Drawing Sheets

RADIO-FREQUENCY IDENTIFICATION (RFID) LOCATIONING SYSTEMS AND METHODS FOR LOCATING ONE OR MORE ITEMS POSITIONED WITHIN A DEFINED SPACE

BACKGROUND

Conventional delivery vehicles, such as those used by shipping companies, including the FEDEX CORPORATION and UNITED PARCEL SERVICE (UPS), INC., have storage areas (e.g., metal box frames) used to store and distribute packages to end customers. Each delivery vehicle is typically loaded at a shipping facility with predesignated boxes using a moving conveyer belt positioned to move the boxes within the storage area. While boxes are generally organized when loaded, such organization can deteriorate after a driver begins a delivery route and visits various end customer destinations, where the boxes get shuffled around and sometimes fall to an already crowded floor of the storage area of the delivery vehicle. In such cases, when it comes time to a deliver a package, the driver can spend a significant amount of time trying to find packages assigned to a given end customer or destination.

Accordingly, there is a need for radio-frequency identification (RFID) locationing systems and methods for locating one or more items positioned within a defined space, e.g., a storage area of a delivery vehicle.

SUMMARY

As described herein for various embodiments, the present disclosure generally describes an RFID based system, and related methods, that use node sensors (e.g., proximity 1-wire RFID node sensors) to determine or detect signal strength of one or more RFID tags positioned within a storage area of a delivery vehicle. An algorithm can be applied to determine a given RFID tag's position from a proximity based on RFID signal strength to X, Y, Z coordinates. The result is a location (e.g., a 3D location) of one or more packages that a driver can use to locate one or more corresponding packages within a vehicle storage area, which can greatly speed up delivery of packages for a given delivery route.

More particularly, in an embodiment, the present invention is a radio-frequency identification (RFID) locationing system configured to locate one or more items positioned within a defined space. The RFID locationing system may include an RFID reader having an RFID antenna. The RFID reader may be configured to emit, via the RFID antenna, a radiation pattern, where the radiation pattern is configured to extend over at least a defined space (e.g., a vehicle storage area). The RFID reader may be further operable to energize an RFID tag corresponding to an item (e.g., a package) positioned within the defined space. In addition, the RFID locationing system may further include a first node channel comprising a first set of RFID receiver nodes. Each RFID receiver node of the first set of RFID receiver nodes is operable to detect signal strength of the RFID tag. In addition, the RFID locationing system may further include a second node channel comprising a second set of RFID receiver nodes. Each RFID receiver node of the second set of RFID receiver nodes is operable to detect signal strength of the RFID tag. In addition, the RFID locationing system may further include a multiplexor communicatively coupled to each of the first node channel, the second node channel, and the RFID reader. Still further, the RFID locationing system may further include a controller configured to alternate the multiplexor causing the multiplexor to receive each of first signal strength data from the first set of RFID receiver nodes of the first node channel and second signal strength data from the second set of RFID receiver nodes of the second node channel. The first signal strength data and the second signal strength data may be provided to the RFID reader and combined to determine a location of the item positioned within the defined space.

In another embodiment, the present invention is an RFID locationing method for locating one or more items positioned within a defined space. The RFID locationing method includes energizing, by an RFID reader having an RFID antenna, an RFID tag corresponding to an item positioned within a defined space, wherein the RFID reader emits, via the RFID antenna, a radiation pattern extending over at least the defined space. The RFID locationing method further includes detecting, by a first RFID receiver node of a first node channel comprising a first set of RFID receiver nodes, a first signal strength of the RFID tag. The RFID locationing method further includes detecting, by a second RFID receiver node of a second node channel comprising a second set of RFID receiver nodes, a second signal strength of the RFID tag. The RFID locationing method further includes alternating a multiplexor, with a controller, to receive at the multiplexor each of first signal strength data from the first RFID receiver node of the first node channel and second signal strength data from the second RFID receiver node of the second node channel. In such embodiments, the first signal strength data and the second signal strength data is provided to the RFID reader and combined to determine a location of the item positioned within the defined space.

In yet a further embodiment, the present invention is a tangible machine-readable medium comprising instructions for locating one or more items positioned within a defined space that, when executed by a processor, cause the processor to at least detect, by a first RFID receiver node of a first node channel comprising a first set of RFID receiver nodes, a first signal strength of the RFID tag. The instructions further cause the processor to detect, by a second RFID receiver node of a second node channel comprising a second set of RFID receiver nodes, a second signal strength of the RFID tag. The instructions further cause the processor to alternate a multiplexor, with a controller, to receive at the multiplexor each of first signal strength data from the first RFID receiver node of the first node channel and second signal strength data from the second RFID receiver node of the second node channel. In such embodiments, the first signal strength data and the second signal strength data is provided to the RFID reader and combined to determine a location of the item positioned within the defined space.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
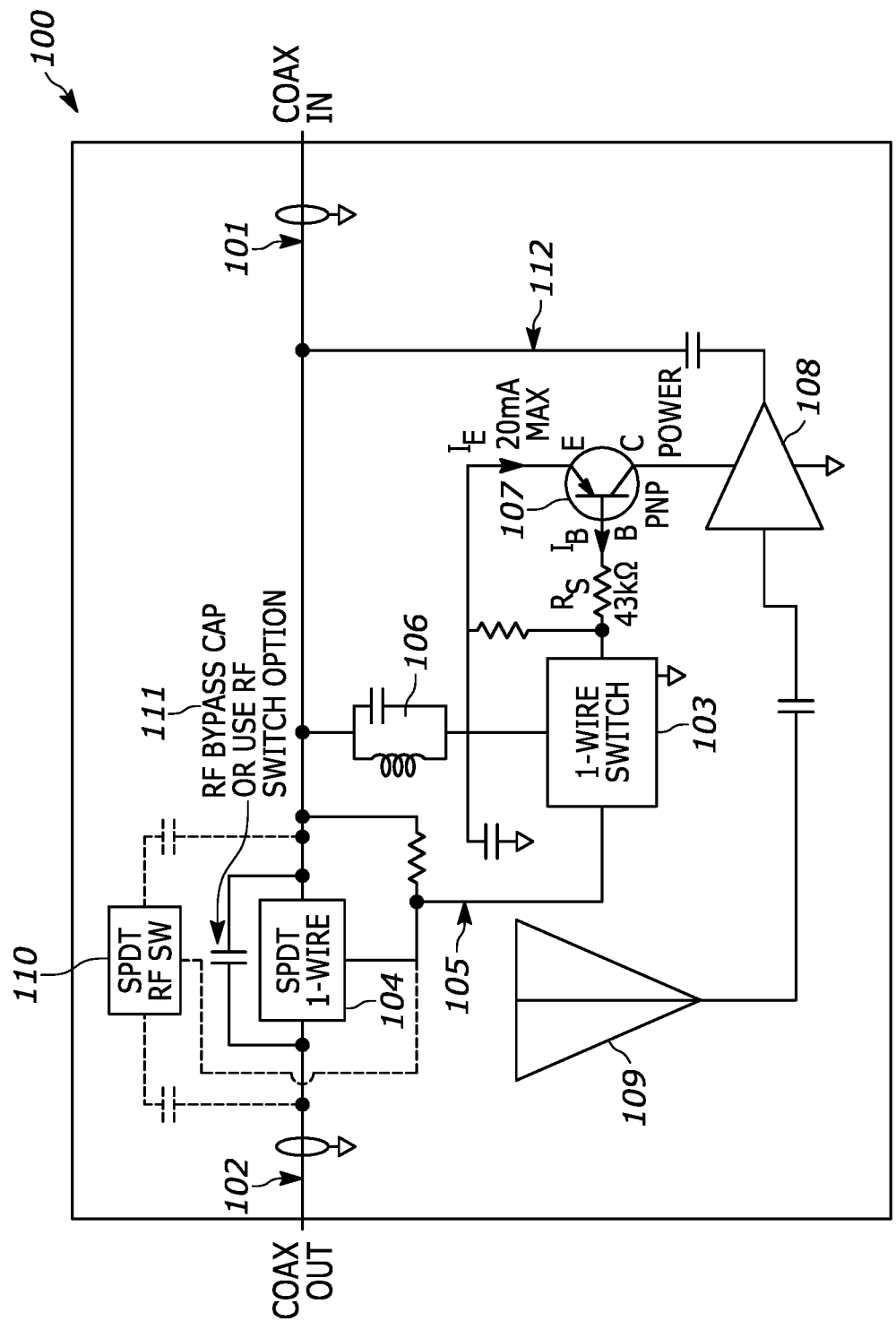
FIG. 1 illustrates a block diagram of an example RFID receiver node, in accordance with various embodiments herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 illustrates a block diagram of an RFID receiver node 100, in accordance with various embodiments herein. The example RFID receiver node 100 includes a coax input 101, a 1-wire single pole double throw coax switch 104, a radio frequency (RF) trap 106, a 1-wire power switch 103, a low noise amplifier (LNA) 108 and its power circuit 107, an antenna 109, and a coax output 102. Coax input 101 provides direct current (DC) power, an RFID signal, and a 1-wire control signal that controls, supplies, or operates switches 103 and 104. The 1-wire power switch 103 branches off the coax signal path through line 105 and radio frequency (RF) trap 106 to connect to the switch programming ports of each switch. Since each switch has a different address, they can be selected independently to provide a sequential or non-sequential scan method. For operation, the presence of DC power and RF is always available to the coax input 101 and line 112.

During selection, the 1-wire control 105 to the switch 103 is programmed to provide DC power to the LNA 108 power control circuit 107. This energizes the LNA 108 to start receiving RFID signals in proximity to antenna 109. The RFID signals get routed through line 112 and back through the coax in connection. The coax input 101 provides physical connectivity, but where the signals get routed back through the coax contrary despite the coax input 101 being designated as an input. In some embodiments, the 1-wire control 105 to switch 104 restricts DC power to the RFID receiver node 100 but is sequentially provided to the entire node channel, of which RFID receiver node 100 is a part (as described for FIG. 2), as switch 104 is activated. This allows all switches 104 to be activated and pass DC power to a successive RFID receiver node via coax out 102 as used in a scan of a vehicle storage area. In addition, as each LNA 108, of the various RFID receiver nodes of a given node channel, is activated and RF is sent to coax input 101 and, consequently, line 112, bypass capacitor 111 allows RFID signals to pass back through each successive RFID receiver node 100 of a given node channel and back to the controller (e.g., as described herein for FIG. 2). As describe herein, a channel refers to a physical wire for linking RFID receiver node(s), which can include, but is not limited to, a metal wire, an optical cable, a coaxial cable, or the like.

Additionally or alternatively, in some embodiments, an alternate circuit using a RF single pole double through (SPDT) switch 110 (as shown in the embodiment of FIG. 1) having broadband characteristics can replace the DC SPDT switch 104 and the bypass capacitor 111.

While RFID receiver node 100 is illustrated to comprise specific components and wiring, it is to be understood that greater or fewer components or wiring may be implemented such that RFID receiver node 100 may be altered in a manner that does not prohibit the operation of RFID locationing system 200 as described herein.

Figure 2:
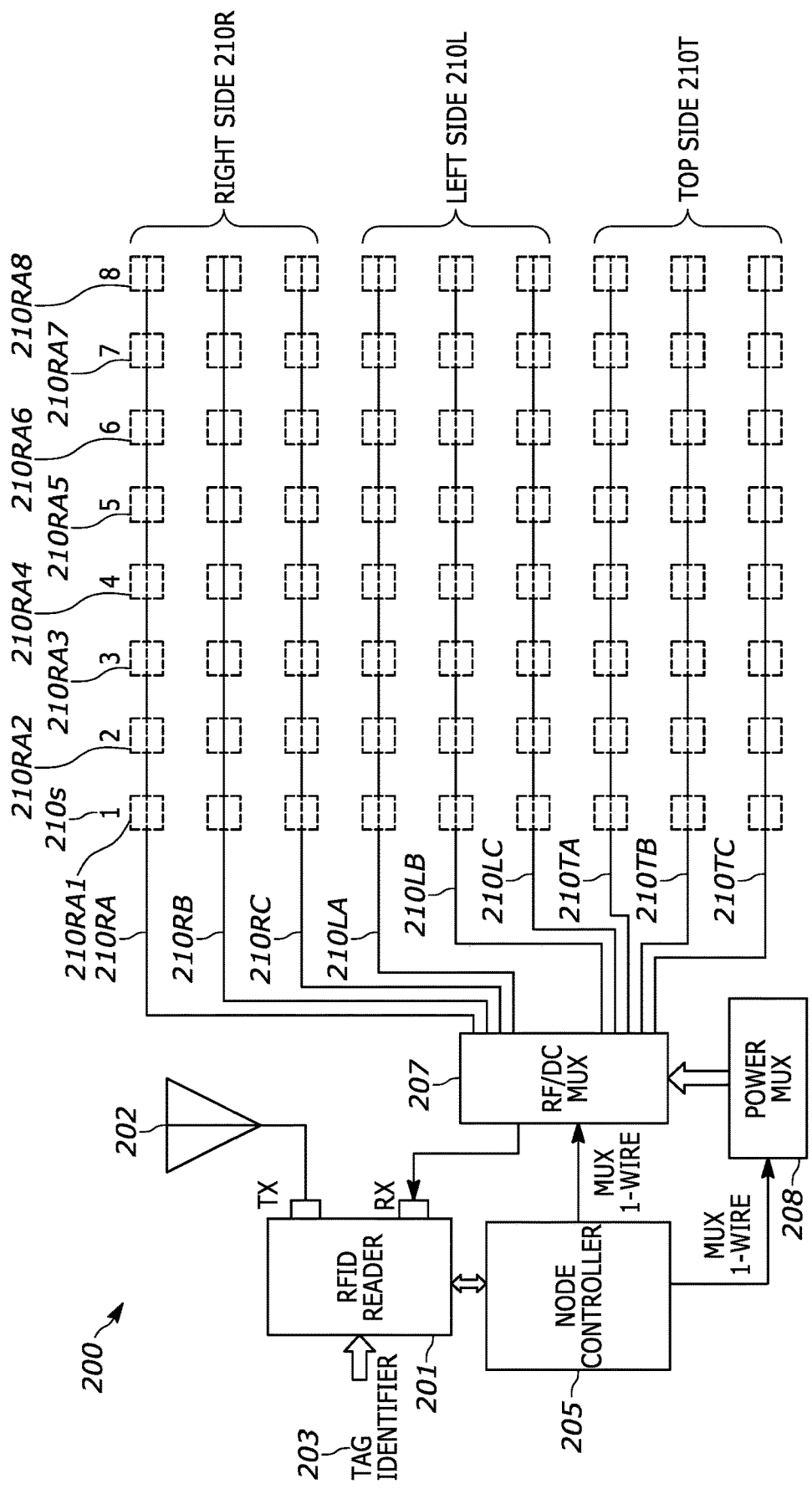
FIG. 2 illustrates a block diagram of an example RFID locationing system comprising a plurality of the RFID receiver nodes of FIG. 1 and configured to locate one or more items positioned within a defined space, in accordance with various embodiments herein.

FIG. 2 illustrates a block diagram of an example RFID locationing system 200 comprising a plurality of RFID receiver nodes (e.g., a plurality of RFID receiver nodes as described for FIG. 1) and configured to locate one or more items positioned within a defined space, in accordance with various embodiments herein. In the embodiment of FIG. 1, RFID locationing system 200 is illustrated as an example node array architecture having specific sides (right, left, and top) each having a set of three node channels, including right side having node channels 210RA-210RC, left side having node channels 210LA-210LC, and top side having node channels 210TA-210TC. It is to be understood, however, that the configuration of FIG. 2 is a non-limiting embodiment, where different node array architectures, each having greater or fewer sides, sizes, numbers, or sets of node channels, or otherwise different configurations of nodes or node channels, are contemplated herein, in accordance with the present disclosure.

In the embodiment of FIG. 2, RFID locationing system 200 is configured to locate one or more items (e.g., packages) positioned within a defined space (e.g., a vehicle storage area of a delivery vehicle). RFID locationing system 200 includes an RFID reader 201 having an RFID antenna 202. RFID reader 201 is configured to emit or transmit (TX), via RFID antenna 202, a radiation pattern (e.g., a radio frequency RF field of view), where the radiation pattern is configured to extend over at least the defined space (e.g., the vehicle storage area of a delivery vehicle). In some embodiments, RFID reader 201 may be an ultra-high frequency (UHF) RFID reader.

RFID reader 201 is further operable to energize an RFID tag corresponding to an item (e.g., a package, box, or other item; not shown in FIG. 2) positioned within the defined space (e.g., the vehicle storage area of a delivery vehicle). The RFID tag that is energized may correspond to the tag identifier 203 input into RFID Reader 203. The tag identifier 203 input can be provided by conventional way, e.g., by scanning a barcode, by manual entry, or other such means. For example, RFID Reader 201 and/or controller 205 may receive tag identifier 203 input from a delivery driver. The tag identifier 203 input may relate to a RFID tag corresponding to a package for delivery at a particular stop or destination, e.g., an address of house is correlated to RFID tag number. In such embodiments, the driver can input a house address to get RFID tag number. The node controller 205 may then sends signals to turn on/off the node channels for determining a location of the item (e.g., package) positioned within the defined space (e.g., vehicle storage area) as described herein.

In addition, RFID locationing system 200 further includes a first node channel (e.g., 210RA) comprising a first set of RFID receiver nodes (e.g., the set of RFID receiver nodes including each of RFID receiver nodes 210RA1, 210RA2, 210RA3, 210RA4, 210RA5, 210RA6, 210RA7, and 210RA8), which are eight nodes in the series 210s of the embodiment of FIG. 2. Each RFID receiver node of the first set of RFID receiver nodes (e.g., each of 210RA1-210RA8) is operable to detect signal strength of the RFID tag. In the embodiment of FIG. 2, first node channel (e.g., 210RA) is one of three node channels (in addition to node channel 210RB and node channel 210RC) positioned on a right side 210R of a defined space (e.g., the vehicle storage area of a delivery vehicle).

In addition, RFID locationing system 200 further includes a second node channel (e.g., 210LA) comprising a second set of RFID receiver nodes (e.g., eight nodes in the series 210s). Each RFID receiver node of the second set of RFID receiver nodes is operable to detect signal strength of the RFID tag. In the embodiment of FIG. 2, second node channel (e.g., 210LA) is one of three node channels (in addition to node channel 210LB and node channel 210LC) positioned on a left side 210L of a defined space (e.g., the vehicle storage area of a delivery vehicle).

Still further, RFID locationing system 200 further includes a third node channel (e.g., 210TA) comprising a third set of RFID receiver nodes (e.g., eight nodes in the series 210s). Each RFID receiver node of the third set of RFID receiver nodes is operable to detect signal strength of the RFID tag. In the embodiment of FIG. 2, third node channel (e.g., 210TA) is one of three node channels (in addition to node channel 210TB and node channel 210TC) positioned on a top side 210L of a defined space (e.g., the vehicle storage area of a delivery vehicle).

It is to be understood that, in some embodiments, each set of RFID receiver nodes can comprise a single RFID receiver node. That is, a "set" can comprise a set of one RFID receiver node. In addition, in various embodiments herein, any of the RFID receiver nodes, e.g., of either the first node channel or the second node channel, can be configured to operate independently of the other nodes of a given set of RFID receiver node.

RFID locationing system 200 further includes a multiplexor 207 communicatively coupled to each of the first node channel (e.g., 210RA), the second node channel (e.g., 210LA), and RFID reader 201.

RFID locationing system 200 further includes a controller 205 configured to alternate multiplexor 207 causing multiplexor 207 to receive each of first signal strength data from the first set of RFID receiver nodes (e.g., each of 210RA1-210RA8) of the first node channel (e.g., 210RA) and second signal strength data from the second set of RFID receiver nodes (e.g., eight nodes in the series 210s) of the second node channel (e.g., 210LA). In the embodiment of FIG. 2, multiplexor 207 is powered by power source 208 (e.g., a DC or AC power source), where each of multiplexor 207 and its power source 208 are controlled by a node controller 205 via 1-wire multiplexor connections. It is contemplated herein, however, that other connections or configurations may be used to alternate the multiplexor.

As shown by FIG. 2, the first signal strength data and the second signal strength data may be provided to RFID reader 201, e.g., via the RFID Reader 201 receive input (RX), and combined to determine a location of the item positioned within the defined space.

In some embodiments, each RFID receiver node may be communicatively coupled together with coaxial cable(s), e.g., via the coax input 101 and coax output 102 of RFID receiver node 100 as shown for FIG. 1. For example, in an embodiment, each RFID receiver node of a first set of RFID receiver nodes of a first channel (e.g., 210RA) may be communicatively coupled to multiplexor 207 via a first coaxial cable, and, in such embodiment, each RFID receiver node of a second set of RFID receiver nodes of a second channel (e.g., 210LA) may be communicatively coupled to multiplexor 207 via a second coaxial cable.

In still further embodiments, each RFID receiver node may be communicatively coupled together in series via coaxial cable(s). For example, in an embodiment, each RFID receiver node of a first set of RFID receiver nodes of a first channel (e.g., 210RA) may be connected in series via the first coaxial cable. In such embodiments, activating a first RFID receiver node (e.g., 210RA1) of the first set of RFID receiver nodes activates each remaining RFID receiver node (e.g., 210RA2 to 210RA8) of the first set of RFID receiver nodes. Other channels may be configured similarly. For example, each RFID receiver node of a second set of RFID receiver nodes of the second channel (e.g., 210LA) may be connected in series via a second coaxial cable. In such embodiments, activating a first RFID receiver node of the second set of RFID receiver nodes activates each remaining RFID receiver node of the second set of RFID receiver nodes (e.g., those of series 210s).

Even though RFID receiver nodes may be communicatively coupled together in series via coaxial cable(s), it is to be understood that each node (e.g., RFID receiver node 100) may operate independently and are managed by controller 205. Instead, only a single RFID receiver node 100 (e.g., 210RA1) can be active at a time. This allows a scan to be sequential or random as determined by controller 205. For example, as described for FIG. 1, each node (e.g., RFID receiver node 100) can be managed through a 1-wire address, which controls the SPDT switch 104 and the 1-wire power switch 103. This allows the controller to access any node.

More generally, one or more of the features of RFID receiver node 100 and RFID locationing system 200, either alone, and especially as a whole, provide unique benefits over conventional approaches. These include, by way of non-limiting example only, the controller implementation via 1-wire interfacing, optimized receiving at the RFID reader via multiplexor 207, a low loss pass-through for non-activated nodes, and a single connection interface. In addition, RFID receiver node 100 and RFID locationing system 200 operates with standard RFID readers, and is operable to operate with a single or multiple 1-wire links. Still further, RFID receiver node 100 and RFID locationing system 200 do not require a specific wavelength dependency.

Figure 3:
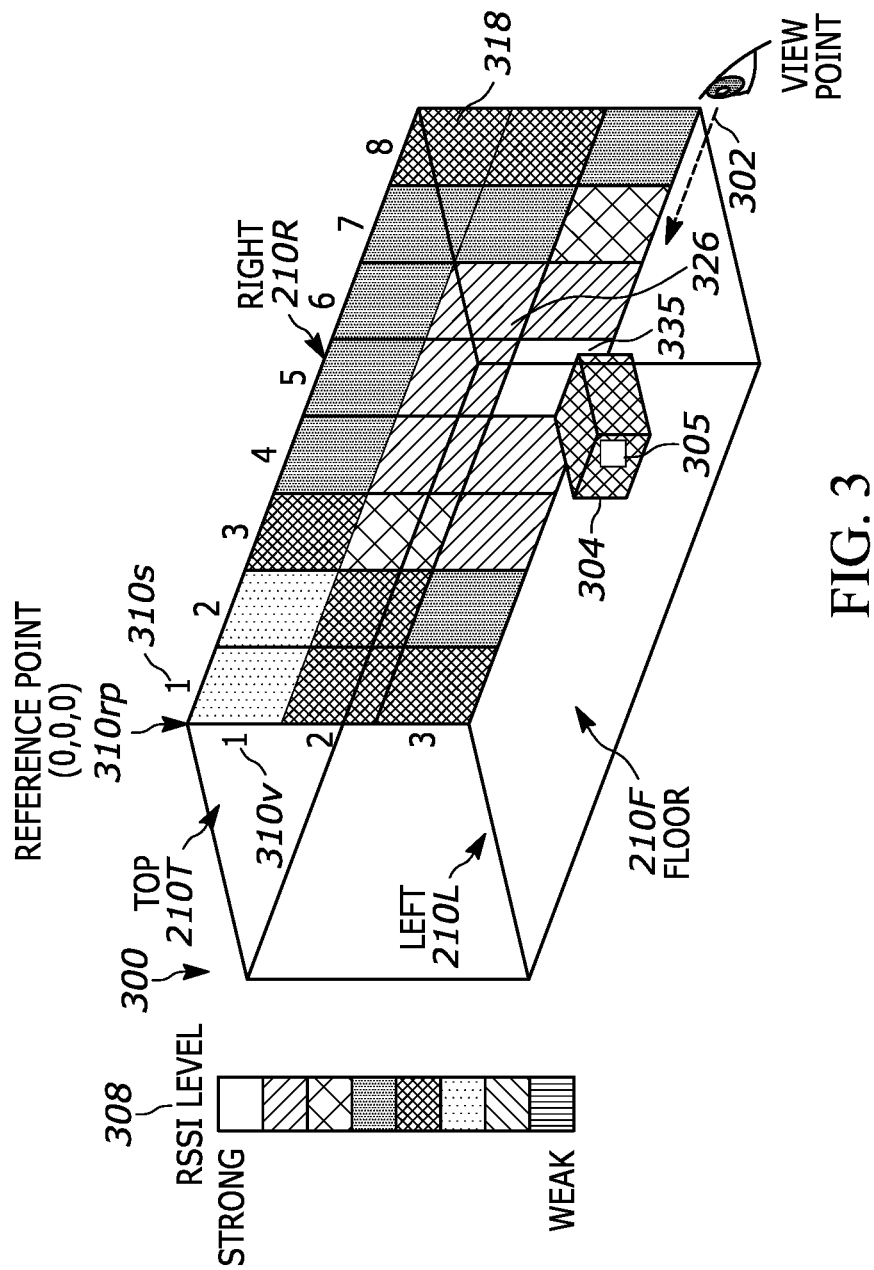
FIG. 3 illustrates a perspective view of a vehicle storage area configurable with the RFID locationing system of FIG. 2, where the vehicle storage area includes a package with an RFID tag.

FIG. 3 illustrates a perspective view of a vehicle storage area 300 configurable with the RFID locationing system 200 of FIG. 2, where the vehicle storage area 300 includes a package 304 with an RFID tag 305. In various embodiments, a vehicle storage area 300 is a defined space (e.g., a storage area of a delivery vehicle) suitable to receive or for installation of the RFID locating system 200. Package 304 is an item positioned within the defined space.

Vehicle storage area 300 is illustrated from a view point 302 looking into a cavity of vehicle storage area 300 that includes a right side 210R, a left side 210L, a top side 210T, and a floor 210F. Each of right side 210R, left side 210L, top side 210T receive the node channels (210RA-210RC), (210LA-210LC), and (210TA-210TC), respectively, as described herein for FIG. 2.

For example, in one embodiment, a first node channel (e.g., 210RA) may be positioned along a first side or surface (e.g., right side 210R) of the defined space (e.g., vehicle storage area 300) and a second node channel (e.g., 210LA) may be positioned along a second side or surface (e.g., left side 210L) of the defined space. It is to be understood that FIG. 3 represents only a single embodiment and that greater or fewer sides and/or node channels may be used or configured within vehicle storage area 300 in different or additional embodiments, including node channels positioned on other sides or surfaces, including, for example, top side 210T and/or floor 210F.

FIG. 3 illustrates right side 210R of vehicle storage area 300 as a logical heat map defining various received signal strength indicator (RSSI) values. Each RSSI value defines an intensity of a signal value, of RFID tag 305, that a given RFID receiver node detects. In FIG. 3, a RFID receiver node (e.g., RFID receiver node 100) is positioned at each of the node positions (e.g., including node position 318, 326, and 335). Each of the node positions is positioned across a grid having a horizontal axis 310s and a vertical axis 310v. Horizontal axis 310s and a vertical axis 310v converge at reference point 310rp, which may be used for two dimensional (2D) and/or three dimensional (3D) positioning and locationing as described herein. In the embodiment of FIG. 3, horizontal axis 310s corresponds to series 210s of FIG. 2, where each of the eight node positions across horizontal axis 310s corresponds to the three node channels (210RA-210RC) of FIG. 2. Each of the three node channels (210RA-210RC) are vertically positioned along vertical axis 310v. In this way, each set of RFID receiver nodes are configured, spaced, or positioned to create the heat map along the wall, side, or surface 210R. Each of the other sides or surfaces E.g., left side 210L, top side 210T, and/or a floor 210F) may be similarly configured with respective node channels (e.g., 210LA-210LC and/or 210TA-210TC) to provide similar heat maps on their respective surfaces or sides, too.

In the embodiment of FIG. 3, the configuration of RFID receiver nodes on right side 210R allows RFID locationing system 200 to determine a location of an item (e.g., package 304) positioned within the defined space (e.g., vehicle storage area 300). In particular, as shown in FIG. 3, an RFID receiver node being nearer to RFID tag 305 (and, as a consequence to the package 304, to which it is affixed) has a higher relative signal strength (e.g., a higher RSSI value). This is shown in FIG. 3 where, for example, an RFID receiver node at node position 335, which is physically nearer to RFID tag 305, has higher RSSI value than each of the RFID receiver nodes at node positions 318 and 326, which are each further away. As shown in FIG. 3, RSSI values and relative signal strength are indicated across a spectrum of RSSI level values 308 from "strong" to "weak" values. RSSI values may be detected by a given RFID receiver node (e.g., via antenna 109) and provided to RFID Reader 201 via the RFID receiver node's given node channel. While RSSI values are described for FIG. 3, other values may be used to map or represent signal strength and proximity within vehicle storage area 300.

Figure 4:
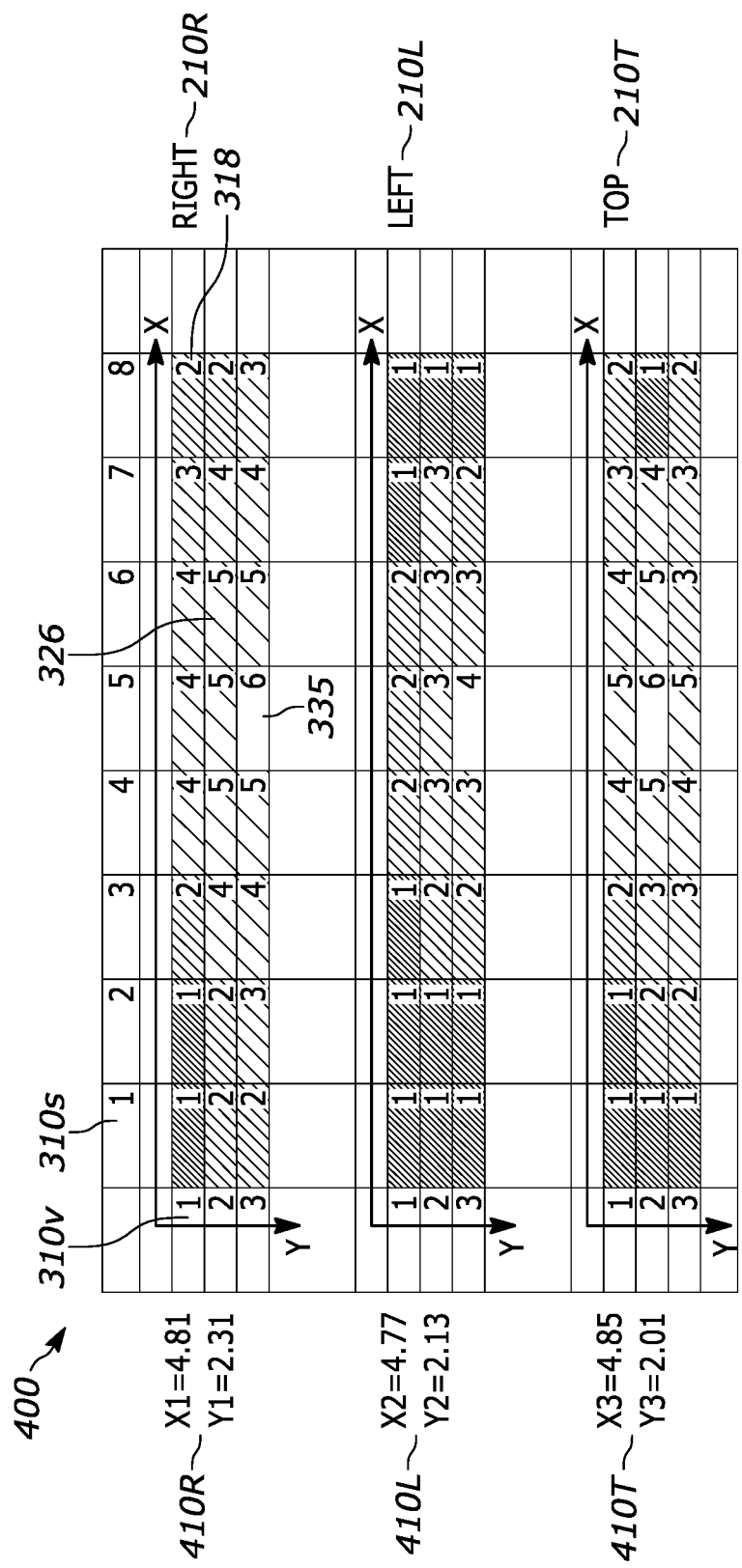
FIG. 4 illustrates a heat mapping defining signal strength data of various node channels of the vehicle storage area of FIG. 3, in accordance with various embodiments herein.

FIG. 4 illustrates a heat mapping 400 defining signal strength data of various node channels of the vehicle storage area 300 of FIG. 3, in accordance with various embodiments herein. Heat mapping 400 depicts three separate heat maps of sides or surfaces of vehicle storage area 300. These include each of right side 210R, left side 210L, and top side 210T. Each of the heat maps include various signal values (e.g., RSSI values) as described for FIG. 3. For example, a heat map with RSSI values for right side 210R, as described for FIG. 3, is shown for FIG. 4. For right side 210R, the RFID receiver node at node position 335 (as described for FIG. 3), which is physically nearer to RFID tag 305, detected an RSSI value of 6. The RFID receiver node at node position 326 (as described for FIG. 3), which is physically further from RFID tag 305, detected an RSSI value of 5. In addition, the RFID receiver node at node position 318 (as described for FIG. 3), which is physically even further from RFID tag 305, detected an RSSI value of 2. In the embodiment of FIG. 4, generally, a higher value indicates a higher detected signal strength. For the heat map for right side 210R, the remaining values of RFID receiver nodes positioned at node positions across horizontal axis 310s and vertical axis 310v are similarly detected and/or determined. Generally, x-values along horizontal axis 310s indicates left-to-right node positions of RFID receiver nodes, and y-values along vertical axis 310v indicates up-to-down node position.

In addition, heat mapping 400 of FIG. 4 also includes heat maps of left side 210L and top side 210T of vehicle storage area 300, which correspond to node channels (210LA-210C) and (210TA-210C), respectively, as described for FIG. 2. Just as described for right side 210R, each of heat maps of left side 210L and top side 210T include RSSI values of each of the respective RFID receiver nodes of left side 210L and top side 210T, where the RSSI values indicate a relative signal strength of proximity of a given RFID receiver node to RFID tag 305.

In addition, each of the heat maps of right side 210R, left side 210L, and top side 210T define values 410R, 410L, and 410T. These values indicate x and y averages and/or center-of-gravity values, along horizontal axis 310s and vertical axis 310v, respectively. Importantly, these values denote relative position of the RFID tag 305 in relation to a given heat map. For example, right side 210R has an x-value of 4.81 and y-value of 2.31 indicating a position of RFID tag 305 relative to the right side of vehicle storage area 300. Similarly, left side 210L has an x-value of 4.77 and y-value of 2.13 indicating a position of RFID tag 305 relative to the left side of vehicle storage area 300. Still further, top side 210T has an x-value of 4.85 and y-value of 2.01 indicating a position of RFID tag 305 relative to the top side of vehicle storage area 300. Each of these x and y values may be used to locate a positon of RFID tag 305, and, as a consequence, package 304.

Figure 5:
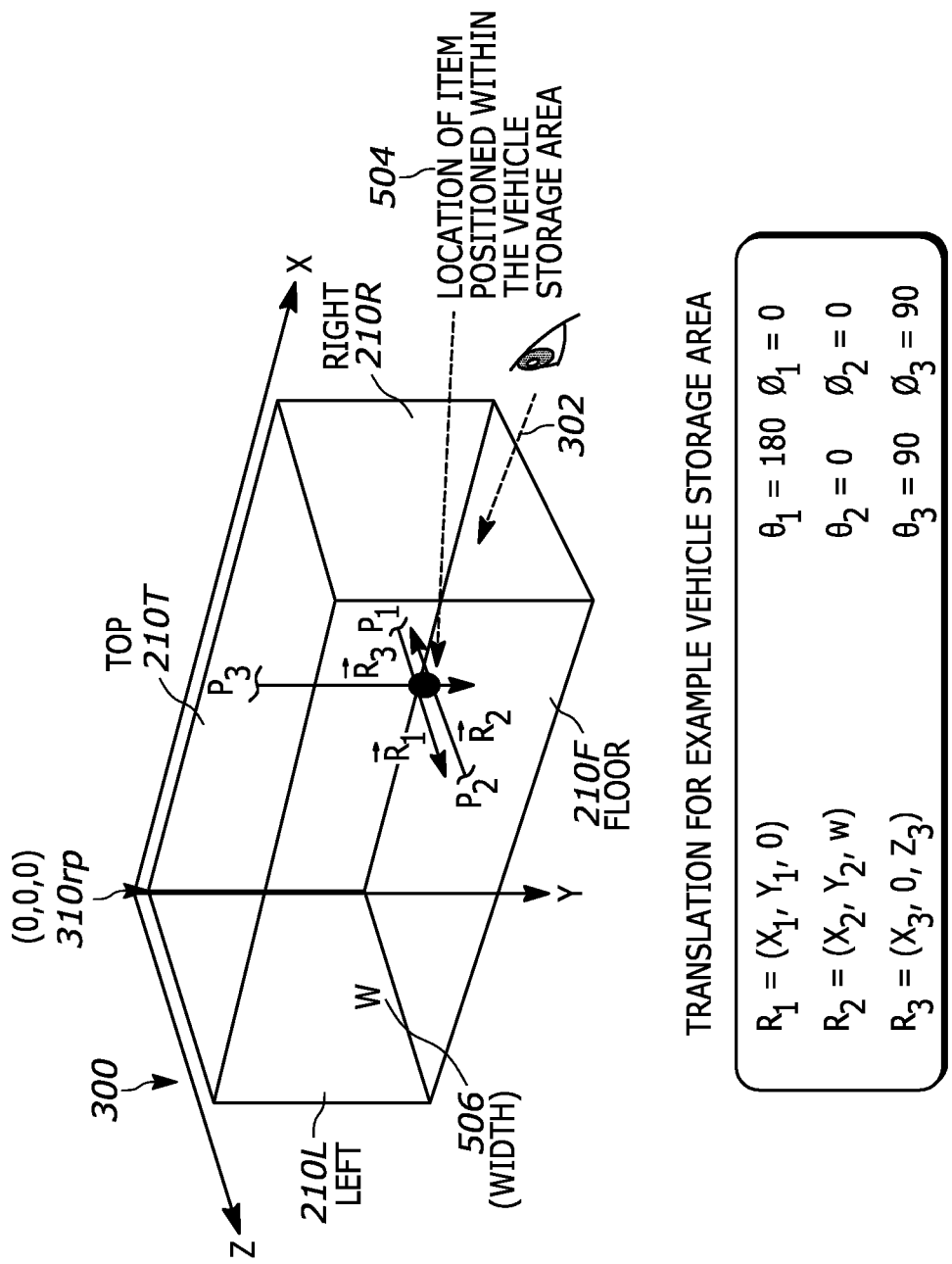
FIG. 5 illustrates a perspective view of the vehicle storage area of FIG. 3 defining coordinate position data of the package of FIG. 3, in accordance with various embodiments herein.

FIG. 5 illustrates a perspective view of vehicle storage area 300 of FIG. 3 defining coordinate position data of package 304 with RFID tag 305 of FIG. 3, in accordance with various embodiments herein. As for FIG. 3, vehicle storage area 300 as illustrated in FIG. 5 is shown from a view point 302 looking into a cavity of vehicle storage area 300 that includes right side 210R, left side 210L, top side 210T, and floor 210F.

In the embodiment of FIG. 5, a 3D location or position of package 304 with RFID tag 305 within vehicle storage area 300 is determined. This is shown, for example, by 3D location 504. However, it is to be understood that the same or similar techniques could be used to determine a 2D position (e.g., where one of the dimensions, e.g., the Z or Y dimension is not determined, removed, or otherwise not required).

In the embodiment of FIG. 5, reference point 310rp defines an initial 3D position of a 3D space within vehicle storage area 300. The coordinate position data of reference point 310rp is (0, 0, 0), having zeroed values (or initial values) for each of the x-axis, y-axis, and z-axis defining vehicle storage area 300. In the embodiment of FIG. 5, all other positions within the 3D space within vehicle storage area 300 are defined relative to reference point 310rp. For example, 3D location 504 has coordinate position data of (10.287, 5.899, −6.216), which defines the location of package 304 with RFID tag 305 within vehicle storage area 300.

The coordinate position data of 3D location 504 is determined by a vectorization of the 3D space of vehicle storage area 300, including each of right side 210R, left side 210L, and top side 210T, and by applying the RSSI values, as determined by each of the RFID receiver nodes of RFID locating system 200 (as described for FIGS. 3 and 4), indicating relative signal strength of RFID tag 305 with the defined 3D space of vehicle storage area 300.

In an embodiment, the determination of 3D location 504 includes generating three vectors ($R_1$, $R_2$, and $R_3$) that, in the embodiment of FIG. 5, correspond to right side 210R, left side 210L, and top side 210T of vehicle storage area 300, respectively. As shown for FIG. 5, each of vectors $R_1$, $R_2$, and $R_3$ are defined by their respective x-values and y-values as determined and described for FIG. 4. Vector $R_2$ is further defined by width 506 of vehicle storage area 300. The direction and orientation of each of vectors $R_1$, $R_2$, and $R_3$ are further defined via their respective angles and orientations as illustrated by each of ($\theta_1=180$, $\varnothing_1=0$), ($\theta_2=0$ $\varnothing_2=0$), and ($\theta_3=90$ $\varnothing_3=90$), respectively.

The position and direction of these vectors, as determined from the three walls (right side 210R, left side 210L, and top side 210T) of vehicle storage area 300, may be computed from the following equations as illustrated in TABLE 1, below.

TABLE 1

(Equations for Item Locationing)

| Vector (Side) | Equation for Vector Position from Side | Equation for Vector Direction from Side (computed from $\phi$ (phi) and $\theta$ (theta) angles) |
|---|---|---|
| R1 (210R) | $R_1 := \begin{pmatrix} 0 \\ 0 \\ 0 \end{pmatrix}$ $\varphi_1 := 30$ $\theta_1 := 120$ | $V_1 := \begin{pmatrix} \cos(\varphi_1 \cdot \frac{\pi}{180})\sin(\theta_1 \cdot \frac{\pi}{180}) \\ \sin(\varphi_1 \cdot \frac{\pi}{180})\sin(\theta_1 \cdot \frac{\pi}{180}) \\ \cos(\theta_1 \cdot \frac{\pi}{180}) \end{pmatrix}$ |
| R2 (210L) | $R_2 := \begin{pmatrix} 20 \\ 0 \\ 0 \end{pmatrix}$ $\varphi_2 := 145 + 0$ $\theta_2 := 120$ | $V_2 := \begin{pmatrix} \cos(\varphi_2 \cdot \frac{\pi}{180})\sin(\theta_2 \cdot \frac{\pi}{180}) \\ \sin(\varphi_2 \cdot \frac{\pi}{180})\sin(\theta_2 \cdot \frac{\pi}{180}) \\ \cos(\theta_2 \cdot \frac{\pi}{180}) \end{pmatrix}$ |
| R3 (210T) | $R_3 := \begin{pmatrix} 10 \\ 15 \\ 0 \end{pmatrix}$ $\varphi_3 := 270$ $\theta_3 := 120$ | $V_3 := \begin{pmatrix} \cos(\varphi_3 \cdot \frac{\pi}{180})\sin(\theta_3 \cdot \frac{\pi}{180}) \\ \sin(\varphi_3 \cdot \frac{\pi}{180})\sin(\theta_3 \cdot \frac{\pi}{180}) \\ \cos(\theta_3 \cdot \frac{\pi}{180}) \end{pmatrix}$ |

Using the above equations, a least mean distance of the vectors may be computed which is used to determine the coordinate position data of 3D location 504 for locating package 304 with RFID tag 305 within vehicle storage area 300.

For example, 3D location 504, including its coordinate position data (10.287, 5.899, −6.216), may be determined by following locationing formula:

$$x := A^{-1} * b \quad \text{(Locationing formula)}$$

In the above formula, variable A is determined from the equations and values of TABLE 1, via the following summation of the vector values:

$$A := \Sigma_k (I - v_k * v_k^T) \quad (A)$$

In the above equation, value I is an identify matrix, k is the number of sides (e.g., three sides, i.e., right side 210R, left side 210L, and top side 210T), and T denotes the transpose of vector or its values (e.g., as matrix).

In addition, variable b of locationing formula is determined from the equations and values of TABLE 1, via the following summation of the vector values:

$$b := \Sigma_k [(I - v_k * v_k^T) R_k] \quad (b)$$

In this way, using the above equations and formulas, coordinate position data of 3D location 504 is determined by a vectorization of the 3D space of vehicle storage area 300, including each of right side 210R, left side 210L, and top side 210T, and by applying the RSSI values, as determined by each of the RFID receiver nodes of RFID locating system 200, indicating relative signal strength of RFID tag 305 with the defined 3D space of vehicle storage area 300 (as described for FIGS. 3 and 4 herein).

For example, in one embodiment, a first coordinate position data (e.g., of vector $R_1$) may be generated from first signal strength data (e.g., as detected by a RFID node receivers of node channel 210RA), and a second coordinate position data (e.g., of vector $R_2$) may be generated from second signal strength data (e.g., as detected by a RFID node receivers of node channel 210LA). A location (e.g., 3D location 504) of the item (e.g., package 304) positioned within the defined space (e.g., vehicle storage area 300) may then be defined as, or otherwise comprise, a 3D position of the item (e.g., package 304) as determined from the first coordinate position data and the second coordinate position data.

Figure 6:
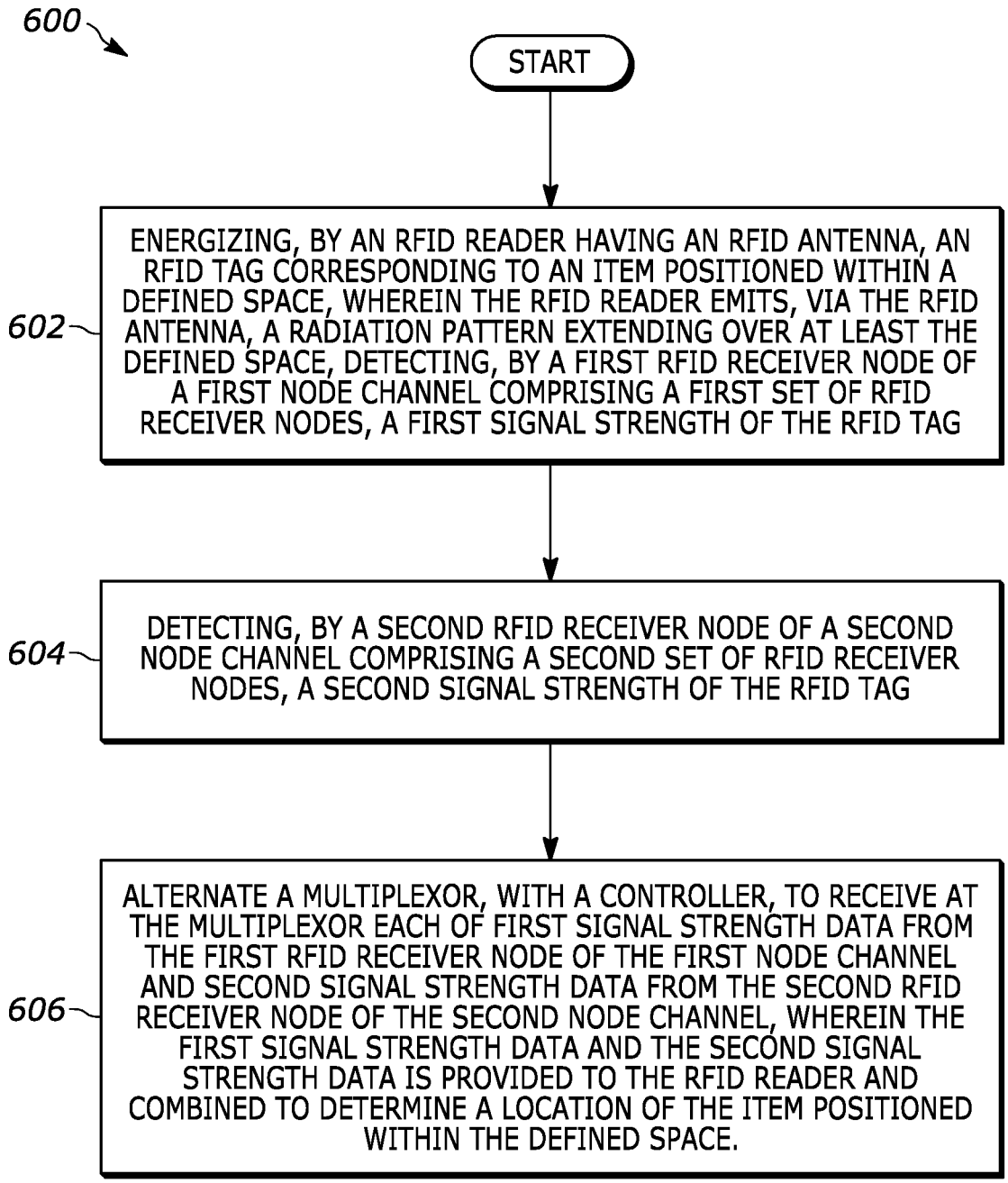
FIG. 6 illustrates an example radio-frequency identification (RFID) locationing method for locating one or more items positioned within a defined space, in accordance with various embodiments herein.

FIG. 6 illustrates an example RFID locationing method 600 for locating one or more items (e.g., package 304) positioned within a defined space (e.g., vehicle storage area 300), in accordance with various embodiments herein. RFID locationing method 600 includes energizing, by an RFID reader (e.g., RFID reader 201) having an RFID antenna (e.g., RFID antenna 202), an RFID tag (e.g., RFID tag 305) corresponding to an item (e.g., package 304) positioned within a defined space (e.g., vehicle storage area 300). As described herein, RFID reader (e.g., RFID reader 201) emits, via the RFID antenna (e.g., RFID antenna 202), a radiation pattern extending over at least the defined space (e.g., vehicle storage area 300).

RFID locationing method 600 further includes detecting, by a first RFID receiver node (e.g., a RFID receiver node 100) of a first node channel (e.g., node channel 210RA) comprising a first set of RFID receiver nodes, a first signal strength of the RFID tag (e.g., RFID tag 305).

RFID locationing method 600 includes further includes detecting, by a second RFID receiver node (e.g., a RFID receiver node 100) of a second node channel (e.g., node channel 210LA) comprising a second set of RFID receiver nodes, a second signal strength of the RFID tag (e.g., RFID tag 305).

RFID locationing method 600 further includes alternating a multiplexor (e.g., multiplexor 207), with a controller (e.g., controller 205), to receive at the multiplexor each of first signal strength data from the first RFID receiver node of the first node channel (e.g., node channel 210RA) and second signal strength data from the second RFID receiver node of the second node channel (e.g., node channel 210LA).

In such embodiments, the first signal strength data and the second signal strength data is provided to the RFID reader (e.g., RFID reader 201) and combined to determine a location of the item (e.g., package 304) positioned within the defined space (e.g., vehicle storage area 300).

In some embodiments, RFID locationing method 600, the location (e.g., 3D location 504) of the item (e.g., package 304) positioned within the defined space (e.g., vehicle storage area 300) is provided to a display of a client device (not shown). The client device may include a screen of a delivery vehicle or a scanning device for use by a driver of the delivery vehicle to find the item/package (e.g., package 304) within the defined space. The client device may be a handheld scanner or a mobile device, such as a tablet, smartphone, laptop, or other such mobile computing device. The client device may implement an operating system or platform for executing the dashboard (or other) apps or functionality, including, for example, any of the Apple iOS platform, the Google Android platform, and/or the Microsoft Windows platform. The client device may include one or more processors and/or one or more memories implementing the dashboard app or for providing other similar functionality. The client device may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

In some embodiments, the client device may implement a dashboard app to receive the location (e.g., 3D location 504) of the item (e.g., package 304) positioned within the defined space (e.g., vehicle storage area 300) and display such data, e.g., in graphical or other format, as described herein. In some embodiments, dashboard app may be implemented via a web platform such as Java J2EE (e.g., Java Server Faces) or Ruby on Rails. In such embodiments, the web platform may generate or update a user interface of the dashboard app via generation of a dynamic webpage (e.g., using HTML, CSS, JavaScript) or via a client-facing mobile app (e.g., via Java for a Google Android based app or Objective-C/Swift for an Apple iOS based app), where the user interface is displayed via the dashboard app on the client device, and where the dashboard app may receive the image data and/or the post-scanning data and display such data in real-time or near real-time.

Figure 7:
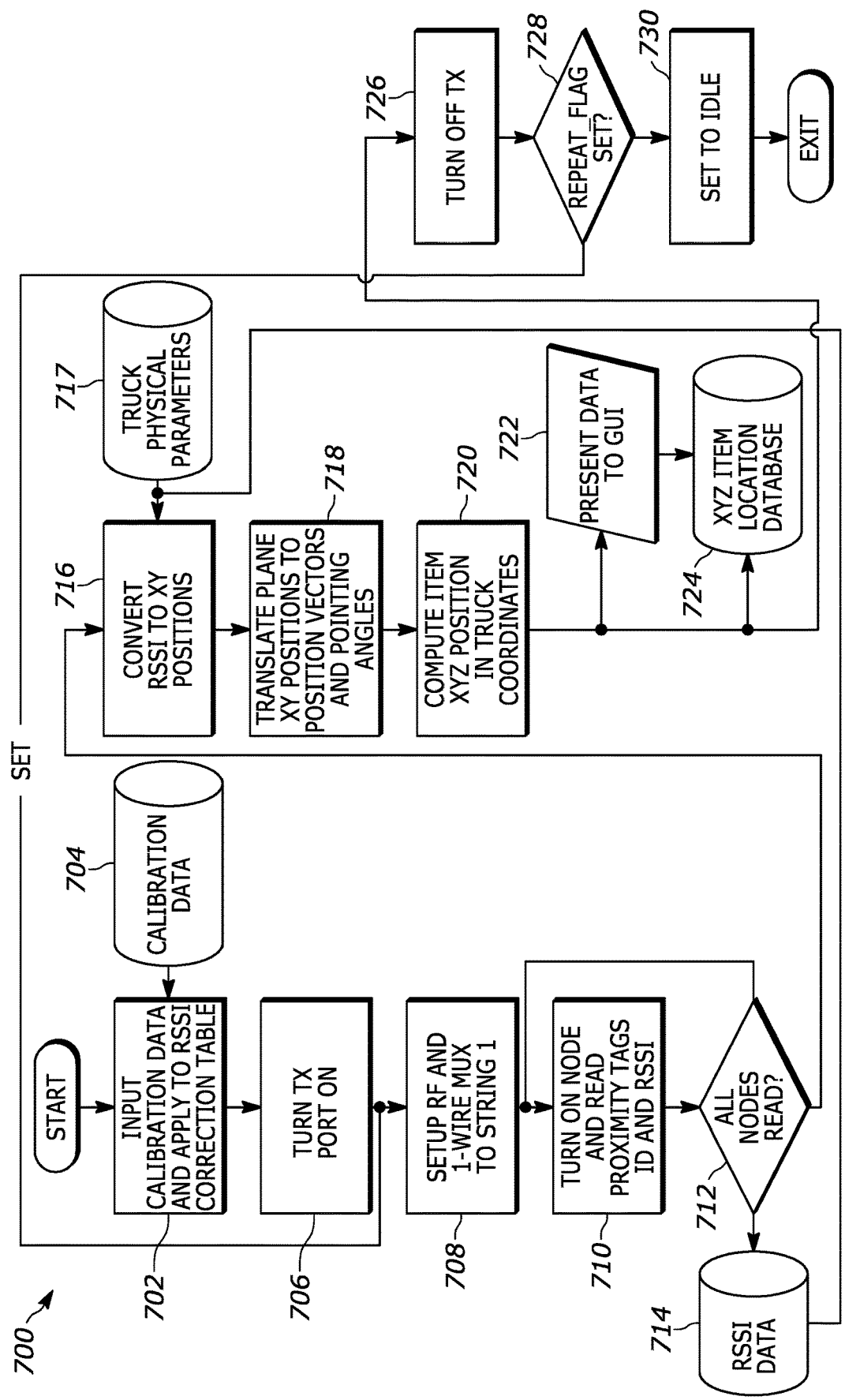
FIG. 7 illustrates an example method comprising the method of FIG. 6 and further comprising updating a location of an item positioned within a defined space, in in accordance with various embodiments herein.

FIG. 7 illustrates an example method 700 comprising RFID locationing method 600 of FIG. 6 and further comprises updating a location of an item (e.g., package 304) positioned within a defined space (e.g., vehicle storage area 300), in accordance with various embodiments herein. In particular, method 700 illustrates a detailed version of RFID locationing method 600. In the embodiment of FIG. 7, method 700 includes a configuration or setup procedure 702 that includes inputting calibration data 704 and applying a RSSI correction table. Setup procedure 702 may be performed when RFID locationing system 200 is installed in vehicle storage area 300 so that baseline noise, specific to vehicle storage area 300, may be computed and may be filtered during the remaining blocks of method 700.

Method 700 includes energizing, by an RFID reader (e.g., RFID reader 201) having an RFID antenna (e.g., RFID antenna 202), an RFID tag (e.g., RFID tag 305) corresponding to an item (e.g., package 304) positioned within a defined space (e.g., vehicle storage area 300). At block 706, energizing occurs when TX port of RFID reader 201 activates RFID antenna 202. That is, this causes any RFID tags (e.g., RFID tag 305) in vehicle storage area 300 to become energized.

At block 708, RF and 1-wire MUX 1-wire of multiplexor 207 is configured as illustrated in FIG. 2. The configuration configures controller 205 to start a scan by alternation the alternate multiplexor 207 and receiving data from one or more of RFID receiver nodes 100. That is, the configuration configures operation of RFID locating system 200 for detecting, by a first RFID receiver node (e.g., a RFID receiver node 100) of a first node channel (e.g., node channel 210RA) comprising a first set of RFID receiver nodes, a first signal strength of the RFID tag (e.g., RFID tag 305). Such configuration also configures operation of RFID locating system 200 for detecting, by a second RFID receiver node (e.g., a RFID receiver node 100) of a second node channel (e.g., node channel 210LA) comprising a second set of RFID receiver nodes, a second signal strength of the RFID tag (e.g., RFID tag 305).

At block 710 each RFID receiver node 100 may be turned so that RFID locating system 200 can read proximity tag IDs (e.g., RFID tag 305) and determine respective RRSI values as described herein for FIGS. 2-5. The one or more RFID receiver nodes of RFID locating system 200 are then scanned and the RSSI data 714 for each RFID tag is captured (this can be done all at once or just for one tag). In some embodiments, RFID reader 201 determines the RSSI value for RFIDs tag for the one or more RFID receiver nodes, and, then optionally saves it in a database for later processing. Thus, for example, as described for method 600, method 700 includes alternating a multiplexor (e.g., multiplexor 207), with a controller (e.g., controller 205), to receive at the multiplexor each of first signal strength data from the first RFID receiver node of the first node channel (e.g., node channel 210RA) and second signal strength data from the second RFID receiver node of the second node channel (e.g., node channel 210LA).

At block 712, method determines whether all nodes (e.g., of the one more RFID receiver nodes 100) are reads. If not, scanning continues.

At block 716, the RSSI values (e.g., as stored as RSSI data 714) are converted to XY positions (2D positions) using truck physical parameters 717, which includes the dimensions (x-values, y-values, and z-values) of the vehicle storage area 300 as described herein for FIGS. 2-5.

Then for one or more detected RFID tags, 3D position(s) or location(s) (e.g., a XYZ position such as 3D location 504) may be determined by translating and converting a location in the vehicle storage area 300. For example, as described for method 600, this may include a first signal strength data and a second signal strength data being provided to the RFID reader (e.g., RFID reader 201) and combined to determine a location of the item (e.g., package 304) positioned within the defined space (e.g., vehicle storage area 300). As illustrated for method 700, this includes, at block 718, translating 2D planar XY positions to position vectors and pointing angles (e.g., as described herein for FIG. 3-5). Using this information, at block 720 RFID locating system 200 computes an item's XYZ position (e.g., 3D location 504 of package 304) in terms of truck (e.g., vehicle storage area 300) coordinates.

At block 722, in embodiments, the location of the item may be presented to a guided user interface (GUI) of a client device, e.g., as described herein for FIG. 6.

In addition, at block 724, in some embodiments, the XYZ item location (e.g., 3D location 504) may be stored in a database.

In some embodiments, once locationing has completed, at block 726, RFID locating system 200 may turn off transmission of RFID antenna 202, ending a current scan cycle of RFID locating system 200.

In still further embodiments, at block 728, RFID locating system 200 may implement a repeat flag, which is a variable in a memory of RFID locating system 200. The repeat flag configures RFID locating system 200 such that a continuous scan is performed where method 700 runs in a repeating loop, updating the scanning of, e.g., methods 600 and/or 700 as described herein. The continuous scan is useful to track items or packages when a delivery vehicle is moving or during dynamic conditions—e.g. bumpy roads, causing the items/packages to shift around in vehicle storage area 300. For example, in some embodiments, controller 205 is configured to alternate multiplexor 207 during a further iteration or cycle to receive each of third signal strength data from the first set of RFID receiver nodes of the first node channel (e.g., node channel 210RA) and fourth signal strength data from the second set of RFID receiver nodes of the second node channel (e.g., node channel 210LA) such that the third signal strength data and the fourth signal strength data is provided to RFID reader 201 and combined to determine an updated location (e.g., an updated version of 3D location 504) of the item (e.g., package 304) positioned within the defined space (e.g., vehicle storage area 300). In such embodiments, the updated location can differ from the location (e.g., 3D location 504) as previously determined for the item (e.g., package 304) positioned within the defined space (e.g., vehicle storage area 300) where, for example, the item moved or shifted around during transit or delivery.

If the repeat flag is not set, then at block 730, RFID locating system 200 may be set to idle and may be ready for a next scan or cycle to detect RFID tags within vehicle storage area 300 as described herein.

Figure 8:
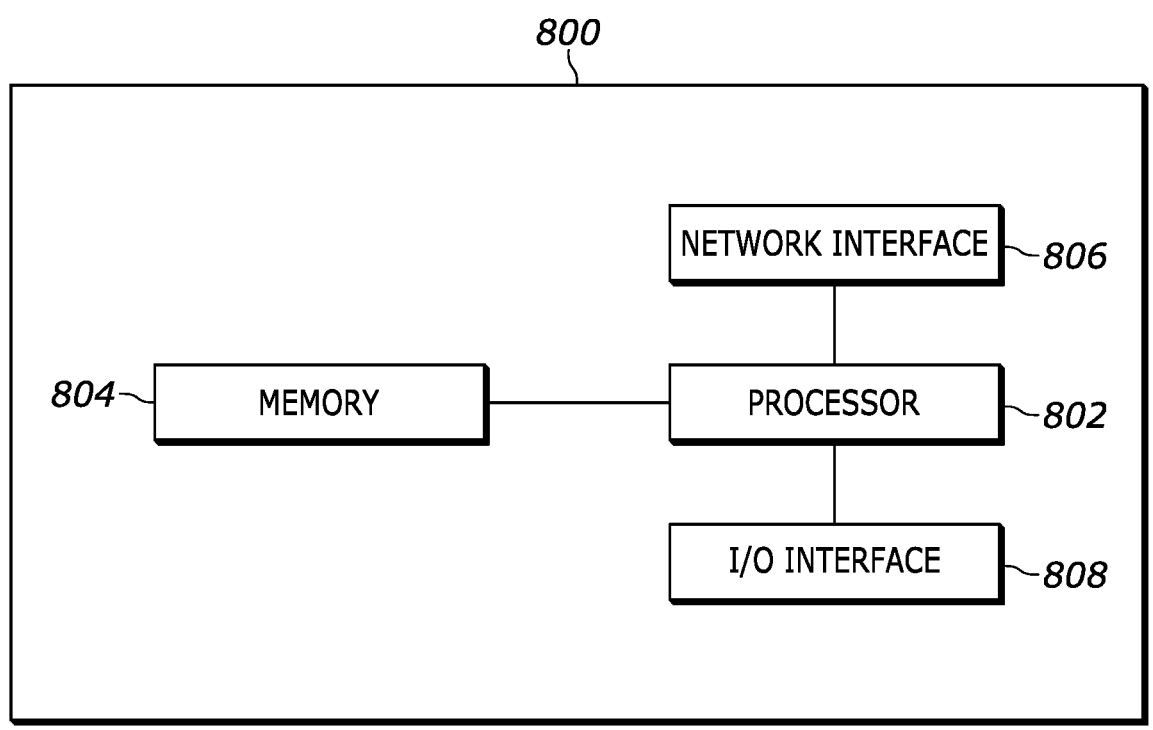
FIG. 8 is a block diagram of an example logic circuit for implementing example methods and/or operations described herein.

FIG. 8 is a block diagram representative of an example logic circuit capable of implementing, for example, one or more components of the example node controller 205 of FIG. 2 or, more generally, the example RFID locationing system 200 of FIG. 2. The example logic circuit of FIG. 8 is a processing platform 800 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 800 of FIG. 8 includes a processor 802 such as, for example, one or more microprocessors, controllers, and/or any suitable type of processor. The example processing platform 800 of FIG. 8 includes memory (e.g., volatile memory, non-volatile memory) 804 accessible by the processor 802 (e.g., via a memory controller). The example processor 802 interacts with the memory 804 to obtain, for example, machine-readable instructions stored in the memory 804 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 800 to provide access to the machine-readable instructions stored thereon.

The example processing platform 800 of FIG. 8 also includes a network interface 806 to enable communication with other machines via, for example, one or more networks. The example network interface 806 includes any suitable type of communication interface(s) (e.g., wired and/or wireless interfaces) configured to operate in accordance with any suitable protocol(s).

The example, processing platform 800 of FIG. 8 also includes input/output (I/O) interfaces 1108 to enable receipt of user input and communication of output data to the user.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A radio-frequency identification (RFID) locationing system configured to locate one or more items positioned within a defined space, the RFID locationing system comprising:
    an RFID reader having an RFID antenna, the RFID reader configured to emit, via the RFID antenna, a radiation pattern, the radiation pattern configured to extend over at least a defined space, the RFID reader operable to energize an RFID tag corresponding to an item positioned within the defined space;
    a first node channel comprising a first set of RFID receiver nodes, each RFID receiver node of the first set of RFID receiver nodes operable to detect signal strength of the RFID tag;
    a second node channel comprising a second set of RFID receiver nodes, each RFID receiver node of the second set of RFID receiver nodes operable to detect signal strength of the RFID tag;
    a multiplexor communicatively coupled to each of the first node channel, the second node channel, and the RFID reader; and
    a controller configured to alternate the multiplexor causing the multiplexor to receive each of first signal strength data from the first set of RFID receiver nodes of the first node channel and second signal strength data from the second set of RFID receiver nodes of the second node channel,
    wherein the first signal strength data and the second signal strength data is provided to the RFID reader and combined to determine a location of the item positioned within the defined space,
    wherein first coordinate position data is generated from the first signal strength data, wherein second coordinate position data is generated from the second signal strength data, and wherein the location of the item positioned within the defined space comprises a three-dimensional (3D) position of the item as determined from the first coordinate position data and the second coordinate position data.

2. The RFID locationing system of claim 1, wherein the defined space comprises a vehicle storage area, and wherein the item positioned within the defined space comprises a package that includes the RFID tag.

3. The RFID locationing system of claim 1, wherein the first node channel is positioned along a first side or surface of the defined space, and wherein the second node channel is positioned along a second side or surface of the defined space.

4. The RFID locationing system of claim 1, wherein each RFID receiver node of the first set of RFID receiver nodes of the first channel is communicatively coupled to the multiplexor via a first coaxial cable, and wherein each RFID receiver node of the second set of RFID receiver nodes of the second channel is communicatively coupled to the multiplexor via a second coaxial cable.

5. The RFID locationing system of claim 4,
wherein each RFID receiver node of the first set of RFID receiver nodes of the first channel is connected in series via the first coaxial cable, and wherein activating a first RFID receiver node of the first set of RFID receiver nodes activates each remaining RFID receiver node of the first set of RFID receiver nodes, and wherein each RFID receiver node of the second set of RFID receiver nodes of the second channel is connected in series via the second coaxial cable, and wherein activating a first RFID receiver node of the second set of RFID receiver nodes activates each remaining RFID receiver node of the second set of RFID receiver nodes.

6. The RFID locationing system of claim 1, wherein the location of the item positioned within the defined space is provided to a display of a client device.

7. The RFID locationing system of claim 1, wherein the controller is configured to alternate the multiplexor during a further iteration to receive each of third signal strength data from the first set of RFID receiver nodes of the first node channel and fourth signal strength data from the second set of RFID receiver nodes of the second node channel,
wherein the third signal strength data and the fourth signal strength data is provided to the RFID reader and combined to determine an updated location of the item positioned within the defined space, and wherein the updated location differs from the location as previously determined for the item positioned within the defined space.

8. A radio-frequency identification (RFID) locationing method for locating one or more items positioned within a defined space, the RFID locationing method comprising:

energizing, by an RFID reader having an RFID antenna, an RFID tag corresponding to an item positioned within a defined space, wherein the RFID reader emits, via the RFID antenna, a radiation pattern extending over at least the defined space, detecting, by a first RFID receiver node of a first node channel comprising a first set of RFID receiver nodes, a first signal strength of the RFID tag;

detecting, by a second RFID receiver node of a second node channel comprising a second set of RFID receiver nodes, a second signal strength of the RFID tag; and alternating a multiplexor, with a controller, to receive at the multiplexor each of first signal strength data from the first RFID receiver node of the first node channel and second signal strength data from the second RFID receiver node of the second node channel, wherein the first signal strength data and the second signal strength data is provided to the RFID reader and combined to determine a location of the item positioned within the defined space, and wherein the defined space comprises a vehicle storage area, and wherein the item positioned within the defined space comprises a package that includes the RFID tag.

9. The RFID locationing method of claim 8, wherein the first node channel is positioned along a first side or surface of the defined space, and wherein the second node channel is positioned along a second side or surface of the defined space.

10. The RFID locationing method of claim 8, wherein each RFID receiver node of the first set of RFID receiver nodes of the first channel is communicatively coupled to the multiplexor via a first coaxial cable, and wherein each RFID receiver node of the second set of RFID receiver nodes of the second channel is communicatively coupled to the multiplexor via a second coaxial cable.

11. The RFID locationing method of claim 10,
wherein each RFID receiver node of the first set of RFID receiver nodes of the first channel is connected in series via the first coaxial cable, and wherein activating a first RFID receiver node of the first set of RFID receiver nodes activates each remaining RFID receiver node of the first set of RFID receiver nodes, and wherein each RFID receiver node of the second set of RFID receiver nodes of the second channel is connected in series via the second coaxial cable, and wherein activating a first RFID receiver node of the second set of RFID receiver nodes activates each remaining RFID receiver node of the second set of RFID receiver nodes.

12. The RFID locationing method of claim 8,
wherein first coordinate position data is generated from the first signal strength data, wherein second coordinate position data is generated from the second signal strength data, and wherein the location of the item positioned within the defined space comprises a three-dimensional (3D) position of the item as determined from the first coordinate position data and the second coordinate position data.

13. The RFID locationing method of claim 8, wherein the location of the item positioned within the defined space is provided to a display of a client device.

14. The RFID locationing method of claim 8, wherein the controller is configured to alternate the multiplexor during a further iteration to receive each of third signal strength data from the first set of RFID receiver nodes of the first node channel and fourth signal strength data from the second set of RFID receiver nodes of the second node channel,
wherein the third signal strength data and the fourth signal strength data is provided to the RFID reader and combined to determine an updated location of the item positioned within the defined space, and wherein the updated location differs from the location as previously determined for the item positioned within the defined space.

15. A tangible machine-readable medium comprising instructions for locating one or more items positioned within a defined space that, when executed by a processor, cause the processor to at least:
- detect, by a first RFID receiver node of a first node channel comprising a first set of RFID receiver nodes, a first signal strength of the RFID tag;
- detect, by a second RFID receiver node of a second node channel comprising a second set of RFID receiver nodes, a second signal strength of the RFID tag; and
- alternate a multiplexor, with a controller, to receive at the multiplexor each of first signal strength data from the first RFID receiver node of the first node channel and second signal strength data from the second RFID receiver node of the second node channel,
- wherein the first signal strength data and the second signal strength data is provided to the RFID reader and combined to determine a location of the item positioned within the defined space, and
- wherein the defined space comprises a vehicle storage area, and wherein the item positioned within the defined space comprises a package that includes the RFID tag.

16. The tangible machine-readable medium of claim 15, wherein the first node channel is positioned along a first side or surface of the defined space, and wherein the second node channel is positioned along a second side or surface of the defined space.

17. The tangible machine-readable medium of claim 15, wherein each RFID receiver node of the first set of RFID receiver nodes of the first channel is communicatively coupled to the multiplexor via a first coaxial cable, and wherein each RFID receiver node of the second set of RFID receiver nodes of the second channel is communicatively coupled to the multiplexor via a second coaxial cable.

* * * * *